U.S. Patent  Apr. 6, 1982  Sheet 1 of 4  4,323,941
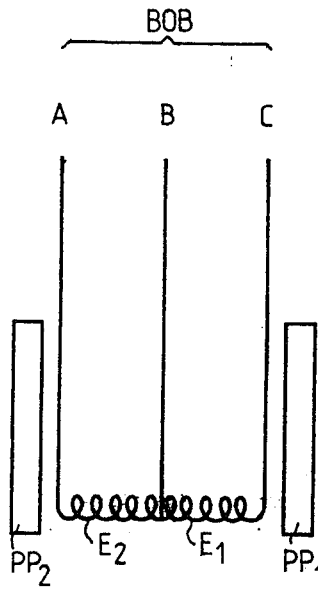
FIG.1a
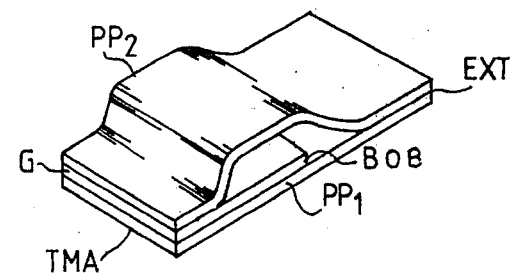
FIG.1b
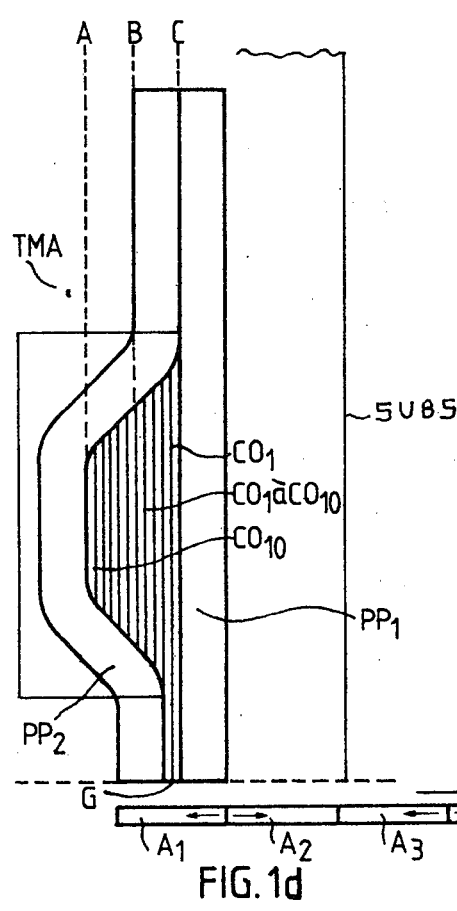
FIG.1d
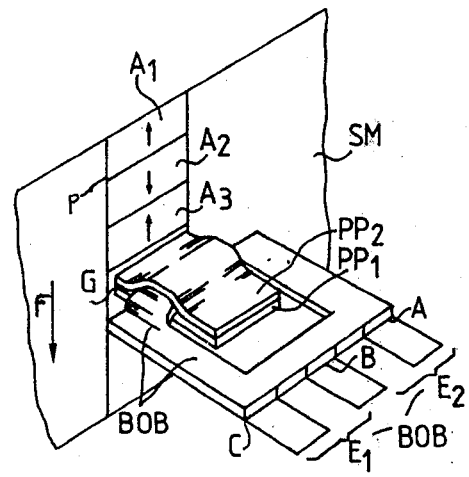
FIG.1c
FIG.1
PRIOR ART

United States Patent [19]

Lazzari et al.

[11] 4,323,941
[45] Apr. 6, 1982

[54] INTEGRATED MAGNETIC TRANSDUCER

[75] Inventors: Jean-Pierre Lazzari, Montfort L'amaury; Jacques Desserre, Rambouillet, both of France

[73] Assignee: Compagnie International pour l'Informatique CII-Honeywell Bull (Societe Anonyme), Paris, France

[21] Appl. No.: 157,845

[22] Filed: Jun. 9, 1980

[30] Foreign Application Priority Data

Oct. 25, 1979 [FR] France .................. 79 26532

[51] Int. Cl.³ .............................................. G11B 5/20
[52] U.S. Cl. .................................................. 360/123
[58] Field of Search .................. 360/123, 126, 127, 55

[56] References Cited

U.S. PATENT DOCUMENTS 4,012,782  3/1977  Lazzari ................................ 360/123
4,260,450  4/1981  Neu ..................................... 360/123

FOREIGN PATENT DOCUMENTS 42-21817  2/1977  Japan .................................... 360/123

Primary Examiner—Robert S. Tupper
Attorney, Agent, or Firm—Edward J. Kondracki

[57] ABSTRACT

A magnetic transducer for reading and/or writing data contained on a carrier comprises two thin magnetic layers constituting the first and second pole pieces of the transducer. The layers are superimposed and magnetically coupled at one end and arranged at the other end adjacent the carrier, substantially perpendicular to the latter to form an air-gap to establish a magnetic circuit for the transducer. A coil is disposed between the thin magnetic layers. The coil is of thin conductive layers superimposed in a direction perpendicular to the plane of the magnetic layers and separated from each other by thin electrically insulating layers. The coil comprises windings of a number of turns $N_1$ and $N_2$ adapted to be traversed respectively by currents $I_1$ and $I_2$, the coefficients of mutual magnetic coupling of each of the thin conductive layers of each of the two windings with the downstream pole piece being respectively designated by $L_{i1}$ and $L_{j2}$ being such that:

$$\sum_{i=1}^{N_1} I_1 L_{i1} = \sum_{i=1}^{N_2} I_2 L_{j2};$$

whereby equal magnetic fluxes are created in the downstream pole piece, the downstream pole piece being defined as that pole piece which is last to be passed by a carrier moving substantially perpendicular to the plane of the layers and the air gap and successively past the first and second pole pieces.

6 Claims, 11 Drawing Figures

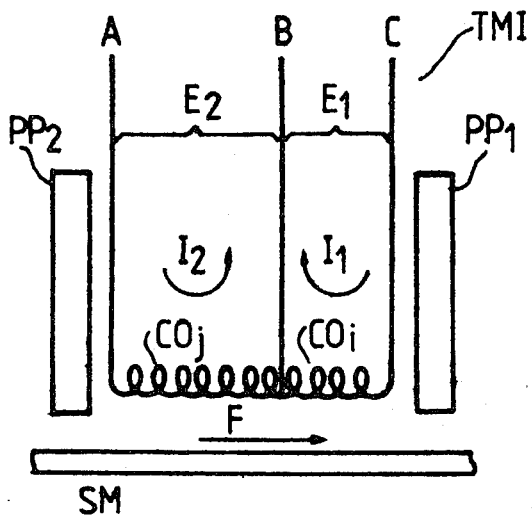

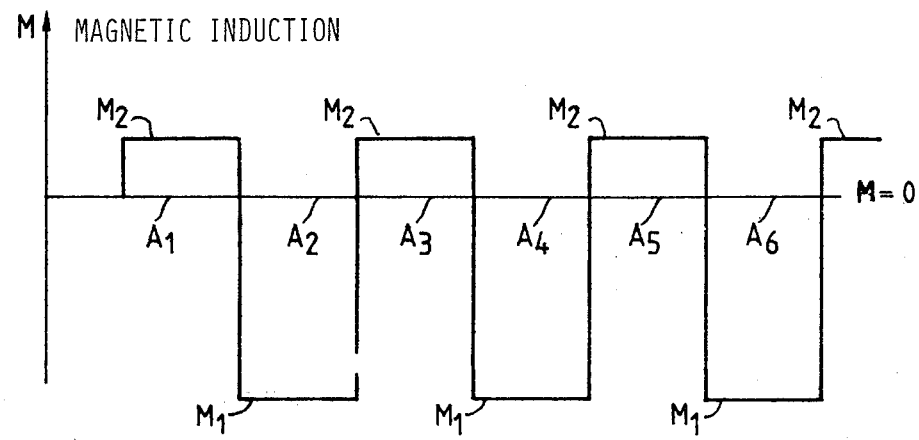
FIG.2 PRIOR ART
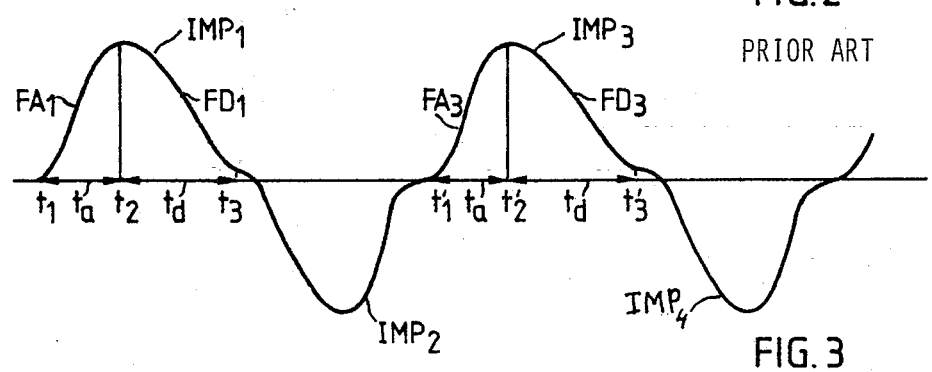
FIG.3 PRIOR ART
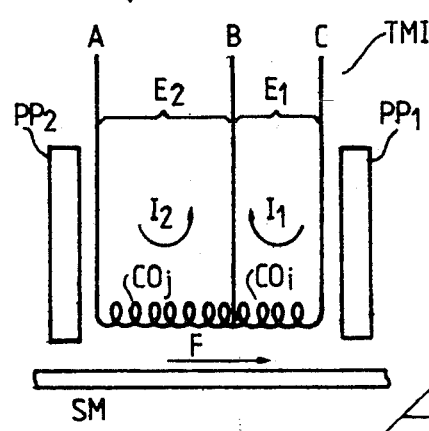
FIG.4a
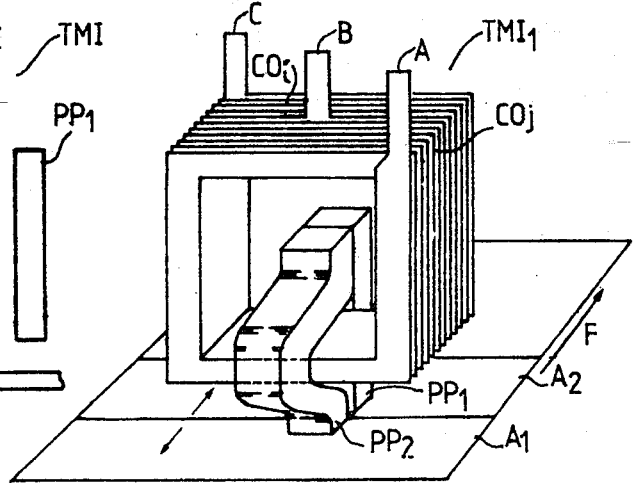
FIG.4b
FIG.4

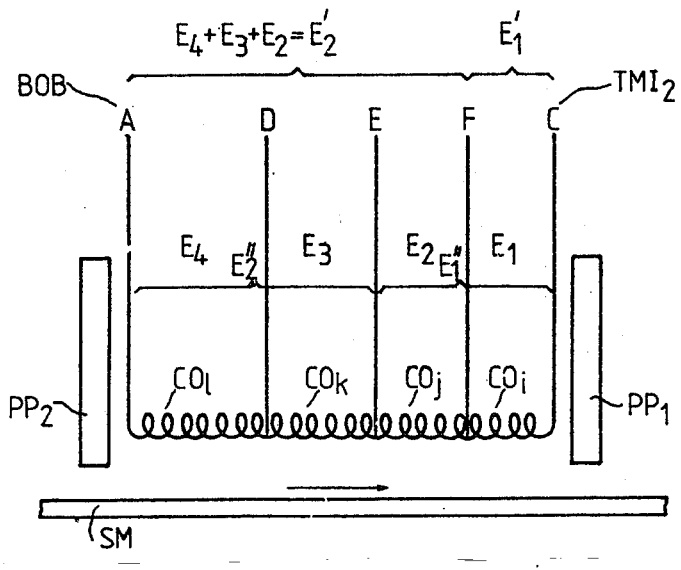
FIG. 5
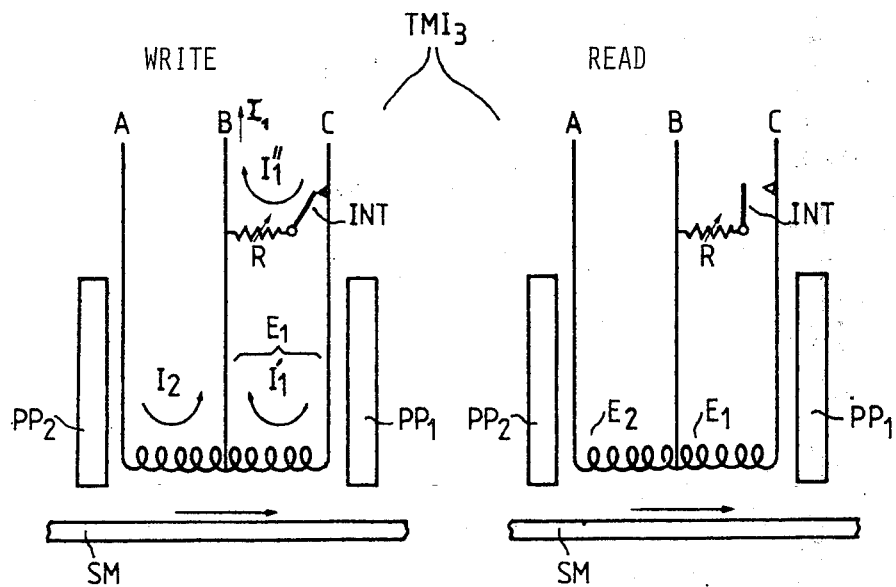
FIG. 6a   FIG. 6b
FIG. 6

INTEGRATED MAGNETIC TRANSDUCER

BACKGROUND OF THE INVENTION

1. Field of the Invention

The present invention relates to integrated magnetic transducers. It is particularly applicable to the reading and/or writing of data contained on magnetic recording carriers such as rigid or flexible discs and tapes.

2. Description of the Prior Art

It is known that, in order to record or write data on a magnetic recording carrier, at least one modification of one of its magnetic properties is created on (or in) the carrier at a plurality of precisely determined locations. This modification is translated by at least one variation of the physical magnitude which characterises the property. The reading of this data is effected by detecting the modifications and by transforming the variation of the physical magnitude into a variation of another physical magnitude which is most often the variation in the voltage or current of an electric signal.

The magnetic property used to record data on a magnetic carrier is defined, for example, either by the absence or the presence of a magnetic induction or by the sign of the latter or again by its direction.

It is known that magnetic discs carry data on concentric circular recording tracks which have a radial width not exceeding a few hundredths of a millimeter and generally covering the greater part of their two faces. Magnetic tapes on the other hand carry data on tracks parallel to the length of the tape.

The most frequently used means, which enable either the recording of data on carriers such as discs or tapes or the reading of data, or possibly to carry out both of these two functions, are called "magnetic transducers." Generally, one or more transducers are associated with a recording carrier, the carrier moving in front of it or them. For simplification it will be assumed in the rest of the text that a single transducer is associated with the same carrier.

A magnetic transducer comprises a magnetic circuit around which is disposed a winding and which comprises an air-gap. The air-gap is disposed at a very short distance from the surface of the carrier of the order of a few tenths of microns. The winding comprises two electric input and/or output wires.

In order to record data on the carrier associated with the transducer, the winding is supplied by an electric current of which the direction or duration of passage can be varied in the winding. The carrier is thus submitted to the magnetic field of intensity and variable direction created by the transducer in the immediate neighborhood of its air-gap (at a few tenths of microns from the latter), which creates a succession of small magnetic areas on each track of the carrier, the size of which areas is of the order of that of the air-gap and which has magnetic inductions of opposite directions. These areas, also called "elementary magnetic areas," are distributed over the entire length of the track.

Conversely, when the data of a given carrier moves past the air-gap of the transducer which is associated with it, the transducer delivers electric signals by means of its electric input and/or output wires, which signals are transmitted to the electronic read circuits associated with the transducers.

The current tendency in the development of magnetic transducers is to produce, according to integrated circuit manufacturing techniques, transducers which are smaller and smaller in size having air-gaps whose dimensions are of the order of the microns. Such transducers are known in the art and are manufactured, for example, by Compagnie Internationale pour l'Informatique CII-Honeywell Bull. Reference may be made to U.S. Pat. Nos. 3,723,665 and 3,846,262 for a description of such magnetic transducers and their method of manufacture.

Other patents related to thin film magnetic transducers to which reference may be made for a better understanding of the invention include U.S. Pat. Nos. 3,344,237; 3,634,933; 3,848,212; 3,879,760; 4,052,749; 4,012,282; 4,072,993; 4,092,688 and RE 29,326. Reference may also be made to IBM Technical Disclosure Bulletin Vol. 14, No. 7, Dec. 1971 of Kehr and Thornley which describes and illustrates a process for fabricating a magnetic recording head.

A transducer of this type comprises, on the one hand:

(a) a magnetic circuit formed by two thin magnetic layers connected at one end in such a manner that they are magnetically coupled, and disposed at the other end adjacent the recording carrier associated with the transducer, so as to form an air-gap. The air-gap is usually situated at a few tenths of microns from the carrier. The air-gap, which is more or less of rectangular shape, is very much longer than it is wide, and approximates the width of the carrier tracks. The carrier is moved more or less perpendicular to the layers which constitute the pole pieces of the transducer. One of the two thin magnetic layers is disposed on a substrate of insulating material and on the other hand:

(b) an electric coil formed between the thin magnetic layers, by thin conductive layers which are superimposed in a direction perpendicular to the plane of the thin magnetic layers. The conductive layers form an envelope containing the conductive layers which are separated from each other by thin electrically insulating layers.

It should be noted that the term "thin layers" designates layers whose thickness is of the order of a few Angstroms to a few microns.

The magnetic recording carrier associated with the transducer moves past the latter perpendicular to the plane of the two magnetic layers, that is to say perpendicularly to the length of the air-gap. During this movement, any magnetic area of a carrier track opposite which the transducer is located, passes successively at right angles with the first magnetic layer which is called an "upstream pole piece" and with the second magnetic layer which is called a "downstream pole piece." Stated another way, the magnetic area successively encounters the upstream and downstream pole pieces or the carrier successively encounters the upstream and downstream pole pieces.

Of the two pole pieces, it is the downstream pole piece which defines the nature of the data recorded on the carrier, that is to say principally the direction and the module of the magnetic induction in each of the magnetic areas created on this carrier. In effect, when the carrier moves past the transducer, each of the areas is submitted successively in time to the magnetic field created by the upstream pole pieces in the immediate neighborhood of its surface, on the side of the transducer air-gap and to the field created by the downstream pole piece, which therefore acts last on the said area.

In other words it can be said that, when data is recorded on the carrier, only the downstream pole piece leaves its "field imprint" on the carrier. Preferably the downstream pole piece of an integrated transducer is that which is placed on the substrate.

In current practice, the coil of an integrated transducer comprises two windings which are identical, that is to say each winding has the same number of turns and has a common point at the center top. The first winding, designated the BC winding (with the reference to FIG. 1) is the winding whose thin conductive layers are closest to the downstream pole piece. The second winding designated the BA winding is the winding whose thin conductive layers are furthest away from the downstream pole pieces. The point B identifies the electric point common to the two windings, and points A and B identify the remaining ends or terminals. The coefficient of mutual magnetic coupling of the first winding BC with the downstream pole piece, also called the coefficient of mutual inductance, is greater than the coefficient of mutual magnetic coupling of the second winding BA with the latter.

This difference in mutual coupling produces the following consequences. It is known that in order to record two successive elementary areas on a track of the recording carrier, one supplies successively the first winding BC with a voltage and/or current pulse, for example a positive one, (the second winding BA is then not fed), and the second winding with a voltage and/or current pulse for example negative (the first winding BC not then being fed). The amplitudes of the negative and positive pulses being equal in absolute value. The coefficients of mutual magnetic coupling of the windings BC, BA with the downstream pole piece being different, the result is, principally, that the modules of the magnetic inductions created by the transducer within the two successive elementary areas recorded are different. The module of magnetic induction in the elementary area recorded by the passage of the electric current in the winding BC is greater than the module of magnetic induction in the elementary area recorded during the passage of the electric current in the winding BA, since the magnetic coupling of the winding BC with the downstream pole piece is greater than that of the winding BC with this same piece.

In other words, a curve representative of the magnetic induction measured along a track of the carrier is asymmetrical with respect to the ordinate or Y axis $M=0$ where M is the magnetic induction. The magnetic induction occurs as a succession of magnetic induction pulses which are alternatively negative and positive, the module of the identical negative pulses being different from the module of the identical positive pulses.

It could again be said that the magnetic induction in the recording carrier is asymmetrical.

When two successive elementary magnetic areas of a track of the carrier go past the transducer, the transducer supplies an electric pulse such that the time interval separating the instant ($t_1$) where its voltage is zero from the instant ($t_2$) where its voltage is maximum is substantially different from the time interval separating this same instant ($t_2$) from the instant ($t_3$) where its voltage returns to zero. It is clear that the same applies for each electric pulse supplied by the transducer when all the elementary areas of a track travel past it. It can then be said that the signal for reading data on a track is asymmetrical as a function of time.

This asymmetry of the signal has disadvantages with respect to exploitation of the signal by the electronic circuits associated with the transducer and can cause errors in determination of the value of data which each of these pulses represents. This risk of error is greater as the density of data along each track of the carrier becomes greater, that is to say when the number of elementary magnetic areas per unit of length measured along the circumference of the track is greatest. In actual current practice, high density data recording carriers are more and more frequently used and thus the problems relating to risk of error have become more important with advancements in transducer technology.

SUMMARY OF THE INVENTION

The present invention enables these drawbacks to be remedied either by giving a different number of turns to each of the windings, the current in each of the latter being identical in module, or by supplying each of the windings by currents of different modules, the number of turns of each of the latter being identical. In other words, in accordance with the present invention, the flux of the magnetic field created by the passage of the current in each of the windings, again called "magnetic flux of each of the windings," through the downstream pole piece of the transducer is the same whether it is a question of the one or the other of the windings. Under these conditions the magnetic induction field in any two adjacent elementary areas recorded on a track of the carrier associated with the transducer is identical in module.

According to the present invention, the transducer for reading and/or writing data contained on a magnetic carrier traveling past the latter comprises a magnetic circuit formed by two thin magnetic layers constituting the pole pieces, superimposed and coupled magnetically at one end and disposed at the other end adjacent the carrier, substantially perpendicularly to the latter to form an air-gap. A coil is disposed between the thin magnetic layers; the coil comprises thin conductive layers which are superimposed in a direction perpendicular to the plane of the magnetic layers and separated from each other by thin electrically insulating layers. The coil comprises at least two windings having a common electrical point disposed such that the magnetic fluxes which they create through the downstream pole piece are equal.

In a preferred embodiment of the invention, the coil comprises two windings ($E_1$ and $E_2$) of a number of turns ($N_1$ and $N_2$) through which pass currents ($I_1$ and $I_2$). The coefficients of mutual magnetic coupling of each of the thin conductive layers of the two windings are such that:

$$\sum_{i=1}^{N_1} L_{i1} I_1 = \sum_{i=1}^{N_2} I_2 L_{j2} + f_{pp1} \tag{1}$$

where $f_{pp1}$ is the flux of the magnetic field of each of the windings through the downstream pole pieces.

BRIEF DESCRIPTION OF THE DRAWINGS

Other characteristics and advantages of the invention will appear in the following text which is given by way of non-limitive example and with reference to the accompanying drawings.

In these drawings:

FIG. 1 illustrates the construction of an integrated magnetic transducer for reading and/or writing data contained on a carrier, according to prior art, and comprises FIG. 1a which is a general diagram of the winding, FIGS. 1b and 1c which are perspective views, a carrier being illustrated in conjunction with the transducer, and FIG. 1d which is a sectional view of a transducer on a plane perpendicular to the carrier and parallel to the direction of movement of the latter;

FIG. 2 is a diagram showing in simplified manner, the distribution of the magnetic induction along a portion of track of a carrier whereon data are recorded by the magnetic transducer according to the prior art;

FIG. 3 shows the form of the read signal of an integrated transducer according to the prior art, a read signal of data being recorded by the transducer on a portion of the track of a recording carrier such as a magnetic disc;

FIG. 4 represents a first embodiment of an integrated magnetic transducer according to the invention, of which the coil comprises two windings and which is made up of FIG. 4a which is a general diagram; and FIG. 4b which is a perspective view;

FIG. 5 is a general diagram showing a second embodiment of an integrated magnetic transducer according to the invention;

FIG. 6 is composed of FIGS. 6a and 6b, which are general diagrams showing a third embodiment of an integrated magnetic transducer according to the invention, and its method of operation;

DESCRIPTION OF THE PREFERRED EMBODIMENTS

Figure 7:
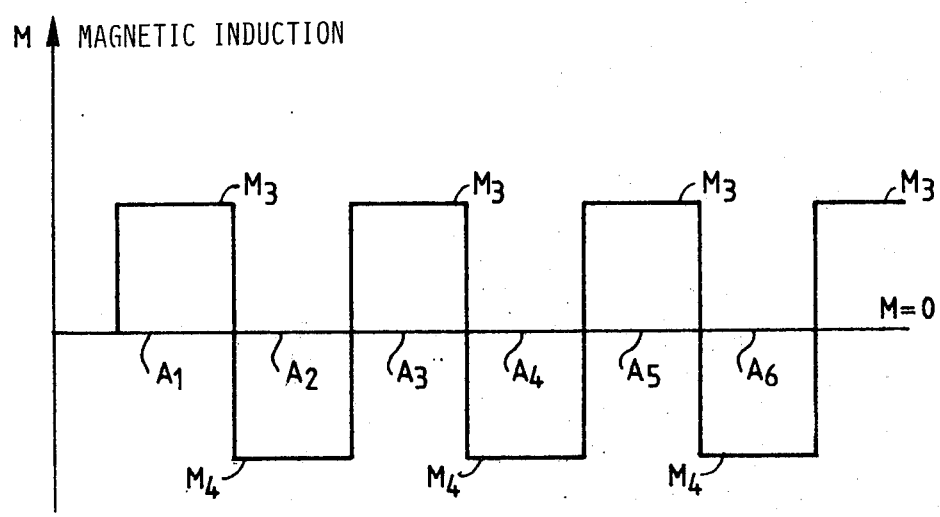
FIG. 7 shows the distribution of the magnetic induction field in several adjacent elementary magnetic areas of a track of a magnetic disc representing data recorded by an integrated magnetic transducer according to the invention.

For a better understanding of how the integrated magnetic transducer according to the invention is constituted, it is useful to recall on the one hand the integrated magnetic transducers of the prior art, which are illustrated in FIGS. 1a, 1b, 1c, and 1d, and on the other hand the disadvantages which the latter have both in writing and reading data, as shown in FIGS. 2 and 3.

Such integrated magnetic transducers have already been described in the above-mentioned U.S. Pat. Nos. 3,123,665 and 3,846,842.

As can be seen from FIGS. 1a to 1d, an integrated magnetic transducer TMA according to the prior art comprises a magnetic circuit formed by two magnetic pole pieces $PP_1$ and $PP_2$ of thin layers entirely superimposed and magnetically coupled to a coil BOB. The pole pieces $PP_1$ and $PP_2$ are magnetostatically coupled together at a first end EXT and form the air-gap G at the other end. The pole piece $PP_1$ arranged on a substrate SUBS as can be seen from FIG. 1d.

In FIGS. 1c, 1d the transducer TMA is shown arranged opposite a recording carrier SM of which only a part has been shown for simplification. This carrier comprises a plurality of recording tracks of which only the track p is shown, which track comprises a plurality of elementary magnetic areas of which only three, namely the areas $A_1$, $A_2$, $A_3$ are shown in FIG. 1c and five, namely $A_1$ and $A_5$, in FIG. 1d. The carrier SM may be a magnetic disc, for example, which belongs to a disc memory. Disc memories are increasingly used in data processing systems because of their storage capacity and the relatively short time taken by write and/or read transducers to access an iten of data contained at any point on the disc from the moment when it receives the order to access this data from the said processing system. When the carrier SM travels in the direction of the arrow F, the pole piece $PP_1$ is the downstream pole piece.

The pole pieces $PP_1$ and $PP_2$ are generally constituted by an assembly of several stacked thin magnetic layers and thin insulating layers, each magnetic layer being separated from the adjacent layer by an insulating layer. The assembly thus defined, whether it comprises one or several thin magnetic layers, is usually designated by the general name "thin magnetic layer."

The coil BOB is formed by a succession of thin conductive and insulating layers stacked in a direction perpendicular to the plane of the magnetic pole pieces in thin layers $PP_1$ and $PP_2$, a part of the conductive and insulating layers being flush in the air gap G. The insulating layers are arranged between the conductive layers. In order to simplify FIG. 1d, only the conductive layers $CO_1$ and $CO_{10}$ have been shown. These conductive layers which have the same shape and are of different dimensions are connected to each other by conductive connector elements which are not shown to simplify FIGS. 1a to 1d.

In current practice, the coil BOB comprises two windings $E_1$ and $E_2$ having a common central point B, their respective ends being C and A. In known manner, in a disc memory comprising several transducers associated with several discs, any transducer with which it is desired to carry out reading operations is selected by transmitting an electric selection pulse on center point B. The coil BOB comprises three output conductors (see FIG. 1c) which are connected to read and/or write electronic circuits of the disc memory containing the disc SM.

During the operations for writing the data of the tracks on one face of the disc SM, each of the windings $E_1$ and $E_2$ is supplied alternatively during the same time interval T by a pulse of rectangular current. The winding $E_1$ is, for example, supplied by a negative pulse, whereas the winding $E_2$ is supplied by a positive pulse, of the same module as the negative pulse.

The distribution of the magnetic induction along a recording track of the disc SM is then that indicated in FIG. 2 where the variation of the induction in the six adjacent elementary areas $A_1$ to $A_6$ is shown. The areas $A_1, A_3, A_5$, are recorded when the winding $E_2$ is supplied by a positive current pulse whilst tha areas $A_2, A_4, A_6$ are recorded when the winding $E_1$ is supplied by the negative current pulse.

The magnetic coupling of the winding $E_1$ with the downstream pole piece $PP_1$ is greater than that of the winding $E_2$ with this same pole piece, and the result is principally that the module $H_2$ of the magnetic induction in the areas $A_1, A_3, A_5$ is less than the induction module $M_1$ in the areas $A_2, A_4, A_6$; along a recording track, the magnetic induction again called "write inductive or write field" is asymmetrical.

The read signal supplied by the transducer TMA shown in FIG. 3 is asymmetrical as a function of the time; thus the time $t_a = (t_2 - t_1) = (t'_2 - t'_1)$ of the ascending front $FA_1, FA_3$ of the positive pulses $IMP_1$ and $IMP_3$ of the read signal is less than the time $t_d = (t_3 - t_2)$ of the descending fronts $FD_1$ and $FD_3$ of these same pulses. Similar statements can be made for the negative pulses $IMP_2$ and $IMP_4$. In current practice, it is relatively frequent that, for technological reasons of manufacture at least two conductive layers of the winding $E_2$ are short circuited which causes a decrease by at least one unit of the number of turns of this winding (it can be shown that the probability of existence of a short circuit for the winding $E_2$ is much greater than for the winding $E_1$), which again increases the asymmetry of the write induction or write field and of the read signal.

To overcome this disadvantage as well as those mentioned above, the transducer TMI according to the invention, which is shown in FIG. 4a, is such that the number of turns of the winding $E_1$ is less than the number of turns of winding $E_2$. Thus, this compensates for the fact that the magnetic coupling $E_1$ with the downstream pole piece $PP_1$ is greater than the coupling of $E_2$ with the latter. To simplify the text, the same references designate the same members of FIGS. 4a, 4b, 5, 6a, 6b on the one hand and in FIGS. 1a and 1d on the other hand.

More generally, with reference to FIGS. 4-6, if $I_1$ is the module of the current which is circulated in the winding $E_1$ during the operations of writing data on the disc SM and if $I_2$ is the module of the current which is circulated in the winding $E_2$ during these same operations, if $L_{i1}$ and $L_{j2}$ designate respectively the mutual induction coefficients of a thin conductive layer $CO_i$, that is to say of a turn, of the winding $E_1$ and of a conductive layer (of a turn $CO_j$) of the winding $E_2$ with the downstream pole piece $PP_1$, and $N_1$ and $N_2$ designate respectively the number of thin conductive layers, that is to say the number of turns of the winding $E_1$ and $E_2$ one has:

$$\sum_{i=1}^{N_1} I_1 \times L_{il} = \sum_{j=1}^{N_2} I_2 L_{j2} = f_{PP_1} \quad (1)$$

The quantities $(I_1 \times L_{i1})$ and $(I_2 \times L_{j2})$ represent respectively the magnetic fluxes created by the passage of currents $I_1$ and $I_2$ in each of the conductive layers $CO_i$ and $CO_j$ through the downstream pole piece $PP_1$. It can be said again, in short, that these quantities represent the magnetic fluxes of each of the conductive layers $CO_i$ and $CO_j$ through the downstream pole piece.

For any one of the windings $E_1$ and $E_2$, $PP_1$ is therefore the sum of the magnetic fluxes of each of the conductive layers which compose it and it represents the magnetic flux created by the passage of the current in this winding through the downstream pole piece: it can be said, in short that it is a matter of the magnetic flux created by this winding, through the downstream pole piece.

FIG. 4b shows a perspective view of a first embodiment $TMI_1$ of a transducer according to the invention, where the winding $E_1$ comprises four turns and the winding $E_2$ comprises seven turns. In FIGS. 4a and 4b, the direction of movement of the disc SM has been indicated by the arrow F.

FIG. 5 is a general diagram of a second embodiment $TMI_2$ according to the invention comprising four windings $E_1$, $E_2$, $E_3$, $E_4$, the winding $E_1$ being the winding closest to the downstream pole piece whereas the winding $E_4$ is the furthest away. Their respective number of turns is $N_1, N_2, N_3, N_4$ with $N_1 < N_2 < N_3 < N_4$. The winding $E_1$ and the winding $E_2$ have a common electrical point F, winding $E_2$ and winding $E_2$ have a common electrical point E, winding $E_3$ and winding $E_4$ have a common electrical point D. $L_{i1'}$, $L_{j2'}$, $L_{k3'}$, $L_{l4'}$ designate respectively the coefficiency of mutual induction of each of the thin conductive layers $CO_i$, $CO_j$, $CO_k$, $CO_l$ of each of the windings $E_1$ to $E_4$ with the downstream pole piece $PP_1$. By supplying in series a part of the windings of the transducer $TMI_2$ by the same current $I_1$, and by supplying in series the other part of the windings by the same current $I_2$, everything happens as if the transducer $TMI_2$ had only two windings $E'_1$ and $E'_2$ (or $E''_1$ and $E''_2$). Thus $E'_1$ can be constituted by the winding $E_1$ traversed by the same current $I_1$. $E'_2$ is then constituted by the association in series of the windings $E_2, E_3, E_4$, (through which passes the same current $I_2$): in this case, the current generator is connected between the electric point F and the end A of the coil BOB, the electric points D and E not being connected to the generator.

Therefore one can write:

$$\sum_{i=1}^{N_1} I_1 L_{il} = \sum_{j=1}^{N_2} I_2 L_{j2} + \sum_{k=1}^{N_3} I_2 L_{k3} + \sum_{l=1}^{N_4} I_2 L_{l4} = f'_{PP_1} \quad (2)$$

$E''_1$ can be constituted by associating in series the windings $E_1$ and $E_2$ (traversed by $I_1$), $E''_2$ being therefore constituted by the association in series of winding $E_3$ and $E_4$ (traversed by $I_2$): in this case, the electric points D and F are not connected to the current generator.

Therefore one has:

$$\sum_{i=1}^{N_1} I_1 L_{j1} + \sum_{j=1}^{N_2} I_1 L_{j2} + \sum_{k=1}^{N_3} I_2 L_{k3} + \sum_{l=1}^{N_4} I_2 L_{i4} = f''_{PP_1}$$

The quantity $f'\ PP_1$ represents the magnetic flux of the windings $E'_1$ and $E'_2$, through the pole piece $PP_1$, whereas the quantity $f''\ PP_1$ represents the magnetic flux of the windings $E''_1$ and $E''_2$ through this same downstream pole piece $PP_1$.

On considering formulae (1), (2) and (3) it is seen that, in order to obtain a symmetrical write fields ($M_3 = M_4$, see also FIG. 7) one can act either on the number of turns of the windings, the currents in each of the latter having an identical module, or on the modules, the shape, the ascending front or descending front of the currents when the windings have the same number of turns, or again on the two simultaneously.

The embodiments of the transducer according to the invention shown in FIGS. 4a, 4b and 5 correspond to solutions consisting in acting on the number of turns of the windings.

FIG. 6 shows a transducer $TMI_3$ where the solution obtained consists in acting on the module of the current in the windings, the number of turns in the windings $E_1$ and $E_2$ being identical, namely N.

As can be seen on this same figure, a resistance R connected in series with a switch INT which is only closed during write operations (see FIG. 6a) is arranged in parallel to the winding $E_1$.

Thus, by supplying each of the windings $E_1$ and $E_2$ alternatively during the same time interval T by an electric signal supplied by a generator of high internal resistance, the resistance of the windings being taken as identical, it is clear that the current $I'_1$ circulating in the winding $E_1$ will be less in module than the current $I_2$ circulating in the winding $E_2$.

In effect, let $R_E$ be the internal resistance in the generator which is very large and $R_{eq} = R \times R_E / R + R_E < R_E$ the resistance equivalent to two resistances R and $R_E$ placed in parallel. As the internal resistance of the generator is much greater on the one hand than the resistance $R_E$ of the winding $E_2$ and on the other hand to the equivalent resistance $R_{eq'}$, the currents $I_2$ and $I_1 = I_1 + I''_1$ ($I'_1$ circulating in the winding $E_1$ and $I''_1$ in the resistance R) are equal in module. Therefore $I'_1 < I_2$ in module. The equation (1) can therefore be satisfied.

During the read operations, the switch INT remains open. Preferably the resistance R is incorporated in the transducer $TMI_3$ during manufacture of the latter.

Another solution to make the write field and the read signal symmetrical consista in using a generator supplying an asymmetrical current such that the current $I_2$ in the winding $E_2$ is greater than the current $I_1$ in the winding $E_1$, the shapes, the ascending and descending fronts of the pulses may be different. The two windings $E_1$ and $E_2$ therefore have the same number of turns, no resistance such as the resistance R of FIG. 6 being connected in parallel on these windings.

FIG. 7 shows the curve of variation in magnetic induction in six successive elementary magnetic areas $A_1$ to $A_6$ of a track p of the magnetic disc SM. These areas are recorded by any one of the transducers $TMI_1$, $TMI_2$ and $TMI_3$ according to the invention. The identical module $M_3$ of the positive inductions in the areas $A_1$, $A_3$ and $A_5$ is equal to the identical module $B_4$ of the negative inductions in the area $A_2$, $A_4$ and $A_6$.

What is claimed is:

1. In a transducer for reading and/or writing data contained on a magnetic carrier passing before the latter, comprising two thin magnetic layers constituting the first and second pole pieces of the transducer, said layers being superimposed and magnetically coupled at one end and arranged at the other end adjacent the carrier, substantially perpendicular to the latter to form an air-gap to establish a magnetic circuit for the transducer, a coil disposed between the thin magnetic layers, said coil being of thin conductive layers superimposed in a direction perpendicular to the plane of the said magnetic layers and separated from each other by thin electrically insulating layers, said coil comprising at least two windings having a common electrical point, the improvement comprising means for creating equal magnetic fluxes in the downstream pole piece, said downstream pole piece being defined as that pole piece which is last to be passed by a carrier moving substantially perpendicular to the plane of the layers and the air gap and successively past the first and second pole pieces.

2. A transducer according to claim 1, wherein the coil comprises two windings of a number of turns $N_1$ and $N_2$ adapted to be traversed respectively by currents $I_1$ and $I_2$, the coefficients of mutual magnetic coupling of each of the thin conductive layers of each of the two windings with the downstream pole piece being respectively designated by $L_{i1}$ and $L_{j2}$ being such that:

$$\sum_{i=1}^{N_1} I_1 L_{i1} = \sum_{i=1}^{N_2} I_2 L_{j2} \tag{1}$$

3. A transducer according to claims 1 or 2, wherein the number of turns of each winding of the coil is higher the greater the distance between the latter and the downstream pole piece.

4. A transducer according to claim 1 or 2, wherein the number of turns of each of the windings are identical, and the currents traversing each winding have intensities that increase with the distance separating them from the downstream pole piece.

5. A transducer according to claim 2, further including a switch and a resistance connected in series, the series switch and resistor being connected in parallel to the winding closest to the downstream pole piece.

6. A transducer according to claim 4, further including a switch and resistance connected in series, the series switch and resistor being connected in parallel to the winding closest to the downstream pole piece.

* * * * *